(12) United States Patent
Zhang et al.

(10) Patent No.: US 9,743,066 B2
(45) Date of Patent: Aug. 22, 2017

(54) METHOD OF FAST ENCODER DECISION IN 3D VIDEO CODING

(71) Applicant: HFI INNOVATION INC., Zhubei, Hsinchu County (TW)

(72) Inventors: Na Zhang, Shangqiu (CN); Jicheng An, Beijing (CN); Jian-Liang Lin, Yilan (TW); Yi-Wen Chen, Taichung (TW); Kai Zhang, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 345 days.

(21) Appl. No.: 14/329,726

(22) Filed: Jul. 11, 2014

(65) Prior Publication Data

US 2015/0022633 A1    Jan. 22, 2015

(51) Int. Cl.
*H04N 13/00*    (2006.01)
*H04N 19/597*    (2014.01)
(Continued)

(52) U.S. Cl.
CPC ..... *H04N 13/0048* (2013.01); *H04N 13/0059* (2013.01); *H04N 19/103* (2014.11);
(Continued)

(58) Field of Classification Search
CPC .............. H04N 19/597; H04N 19/176; H04N 13/0059; H04N 19/103; H04N 13/0048; H04N 19/196
(Continued)

(56) References Cited

U.S. PATENT DOCUMENTS

| 9,615,078 B2 | 4/2017 | Lee et al. |
|---|---|---|
| 2010/0150233 A1 | 6/2010 | Kim et al. |

FOREIGN PATENT DOCUMENTS

| CN | 102857759 A | 1/2013 |
|---|---|---|
| CN | CN 102984521 A | 3/2013 |

(Continued)

OTHER PUBLICATIONS

Bruno Zatt (Federal Univ of Rio Grande Do Sul et al: "An Adaptive Early Skip Mode Decision Scheme for Multiview Video Coding", Picture Coding Symposium 201 O; Aug. 12, 2010-Oct. 12, 201 O; Nagoya,, Dec. 8, 2010 (Dec. 8, 2010), XP030081924.*

(Continued)

*Primary Examiner* — Nguyen Truong
(74) *Attorney, Agent, or Firm* — McClure, Qualey & Rodack, LLP (57) ABSTRACT

Multi-view video encoding using early Merge mode decision and/or early CU split termination is disclosed. The present invention encodes a current coding block using the Merge/Skip mode without evaluating coding performance for at least one of Inter modes and Intra modes if the coding conditions associated with the current coding block and a neighboring block set of the current coding block are asserted. The coding conditions may correspond to whether the coding performance of the Skip mode is better than the coding performance of 2N×2N Merge mode for the current coding block and whether all blocks in the neighboring block set select the Merge mode or the Skip mode. Similarly, the process of splitting the current coding block into smaller coding blocks can be terminated without evaluating coding performance associated with the smaller coding blocks from splitting the current coding block if some coding conditions are asserted.

10 Claims, 9 Drawing Sheets

(51) Int. Cl.
  H04N 19/176 (2014.01)
  H04N 19/196 (2014.01)
  H04N 19/103 (2014.01)
(52) U.S. Cl.
  CPC ......... *H04N 19/176* (2014.11); *H04N 19/196* (2014.11); *H04N 19/597* (2014.11)
(58) Field of Classification Search
  USPC .......................................................... 348/43
  See application file for complete search history.

(56) References Cited

FOREIGN PATENT DOCUMENTS

| CN | CN 103108183 A | 5/2013 |
|---|---|---|
| WO | WO 2012/081877 A2 | 6/2012 |

OTHER PUBLICATIONS

Liquan Shen et al: "An Effective CU Size Decision Method for HEVC Encoders", IEEE Transactions on Mul Ti Media, IEEE Service Center, Piscataway, NJ, US, vol. 15, No. 2, Feb. 1, 2013 (Feb. 1, 2013 ), pp. 465-470, XP011487705, ISSN: 1520-9210, DOI: 10.1109/TMM.2012.2231060.*

Tech G et al: "3D-HEVC Test Model 4", 4. JCT-3V Meeting; Apr. 20, 2013-Apr. 26, 2013; Incheon; (The Joint Collaborative Team on 3D Video Coding Extension, Development of ISO/IEC JTC1/SC29/WG11 and ITU-T SG.16 ); URL: http://phenix.int-evry.fr/jct2/,, No. JCT3V-D1005, Jun. 17, 2013 (Jun. 17, 2013), XP030130983.*

Jaehwan Kim et al: "Early determination of mode decision for HEVC",2012 Picture Coding Symposium (PCS 2012) : Krakow, Poland, May 7-9, 2012 ; [Proceedings], IEEE, Piscataway, NJ, May 7, 2012 (May 7, 2012), pp. 449-452, XP032449798, DOI: 10.1109/PCS.2012.6213251 ISBN: 978-1-4577-2047-5.*

Zatt, B., et al.; "An Adaptive Early Skip Mode Decision Scheme for Multiview Video Coding;" 28th Picture Coding Symposium; Dec. 2010; pp. 42-45.

Shen, L., et al.; "An Effective CU Size Decision Method for HEVC Encoders;" IEEE Transactions on Multimedia; vol. 15; No. 2; Feb. 2013; pp. 465-470.

Shen, L., et al.; "Early Skip Mode decision for MVC Using Inter-view Correlation;" International Organisation for Standarisation; Oct. 2009; pp. 1-8.

Tech, G., et al.; "3D-HEVC Test Model 4;" Joint Collaborative Team on 3D Video Coding Extension Development of ITU-T SG 16 WP 2 and ISO/IEC JTC 1/SC 29/WG 11; Apr. 2013; pp. 1-52.

Kim, J., et al.; "Early Determination of Mode Decision for HEVC;" 2012 Picture Coding Symposium; May 2012; pp. 449-452.

Zhang, N., et al.; "Fast encoder decision for texture coding in 3D-HEVC;" Signal Processing: Image Communication; Jun. 2014; pp. 951-961.

Zhang, N., et al.; "3D-CE3h related—Fast encoder decision for texture coding;" Joint Collaborative Team on 3D Video Coding Extension Development of ITU-T SG 16 WP 2 and ISO/IEC JTC 1/SC 29/WG 11; Aug. 2013; pp. 1-6.

Yang, J., et al.; "Early SKIP Detection for HEVC;" Joint Collaborative Team on Video Coding (JCT-VC) of ITU-T SG16 WP3 and ISO/IEC JTC1/SC29/WG11; Nov. 2011; pp. 1-6.

Lee, J.Y., et al.; "3D-CE3.h related: Removal of depth quadtree prediction and simple early depth CU decision for fast encoding;" Joint Collaborative Team on 3D Video Coding Extensions of ITU-T SG 16 WP 3 and ISO/IEC JTC 1/SC 29/WG 11; Apr. 2013; pp. 1-2.

* cited by examiner

Inter-view reference picture

Dependent view

METHOD OF FAST ENCODER DECISION IN 3D VIDEO CODING

CROSS REFERENCE TO RELATED APPLICATIONS

The present invention claims priority to PCT Patent Application, Serial No. PCT/CN2013/079584, filed on Jul. 18, 2013, entitled "Methods for Fast Encoder Decision". The PCT Patent Application is hereby incorporated by reference in its entirety.

FIELD OF THE INVENTION

The present invention relates to three-dimensional video encoding. In particular, the present invention relates to fast encoder mode decision including early Merge mode and early split termination decision in multi-view coding system.

BACKGROUND AND RELATED ART

Three-dimensional (3D) television has been a technology trend in recent years to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, typical multi-view video coding exploits inter-view redundancy. Therefore, most 3D Video Coding (3DVC) systems take into account of the correlation of video data associated with multiple views and depth maps.

In the reference software for HEVC based 3D video coding (3D-HTM), inter-view candidate is added as a motion vector (MV) or disparity vector (DV) candidate for Inter, Merge and Skip mode in order to re-use previously coded motion information of adjacent views. In 3D-HTM, the basic unit for compression, termed as coding unit (CU), is a 2N×2N square block. Each CU can be recursively split into four smaller CUs until a predefined minimum size is reached. Each CU contains one or more prediction units (PUs).

Figure 1:
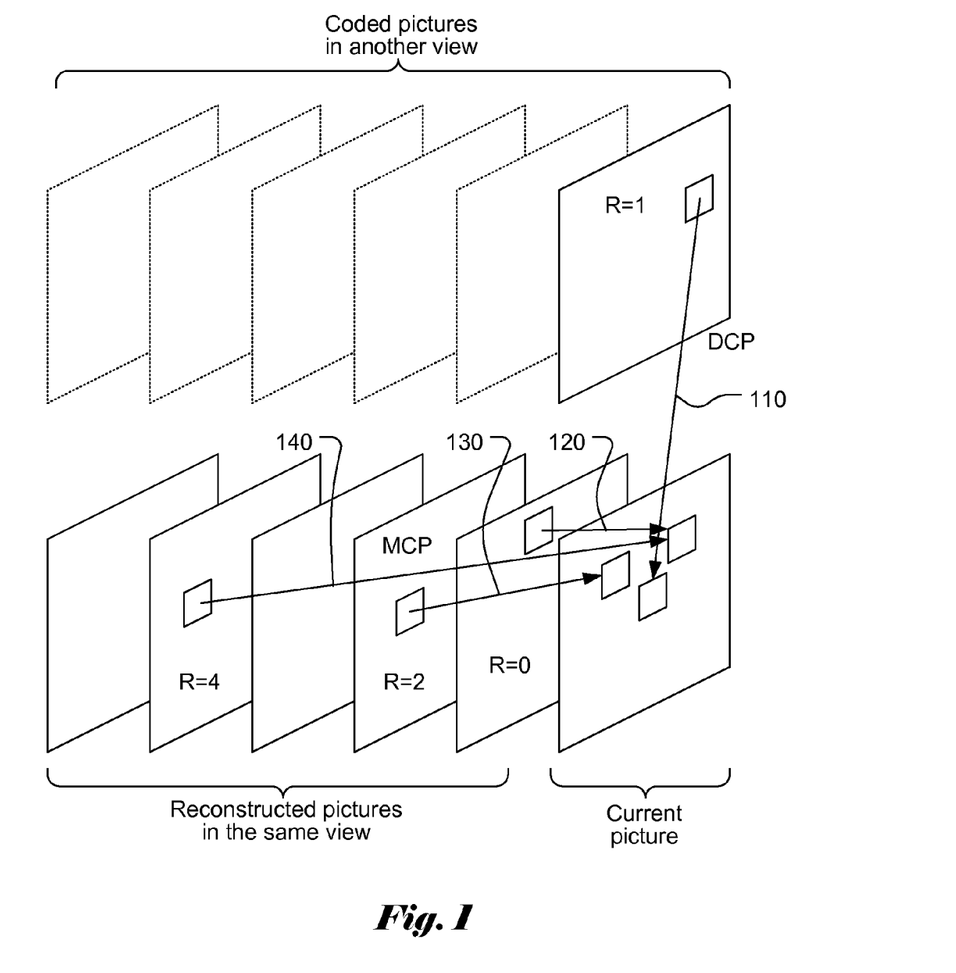
FIG. 1 illustrates an example of three-dimensional coding incorporating disparity-compensated prediction (DCP) as an alternative to motion-compensated prediction (MCP).

To share the previously coded texture information of adjacent views, a technique known as Disparity-Compensated Prediction (DCP) has been included in 3D-HTM as an alternative coding tool to motion-compensated prediction (MCP). MCP refers to an inter-picture prediction that uses previously coded pictures of the same view, while DCP refers to an inter-picture prediction that uses previously coded pictures of other views in the same access unit. FIG. 1 illustrates an example of 3D video coding system incorporating MCP and DCP. The vector (110) used for DCP is termed as disparity vector (DV), which is analog to the motion vector (MV) used in MCP. FIG. 1 illustrates three MVs (120, 130 and 140) associated with MCP. Moreover, the DV of a DCP block can also be predicted by the disparity vector predictor (DVP) candidate derived from neighboring blocks or the temporal collocated blocks that also use inter-view reference pictures. In 3D-HTM, when deriving an inter-view Merge candidate for Merge/Skip modes, if the motion information of corresponding block is not available or not valid, the inter-view Merge candidate is replaced by a DV.

Figure 2:
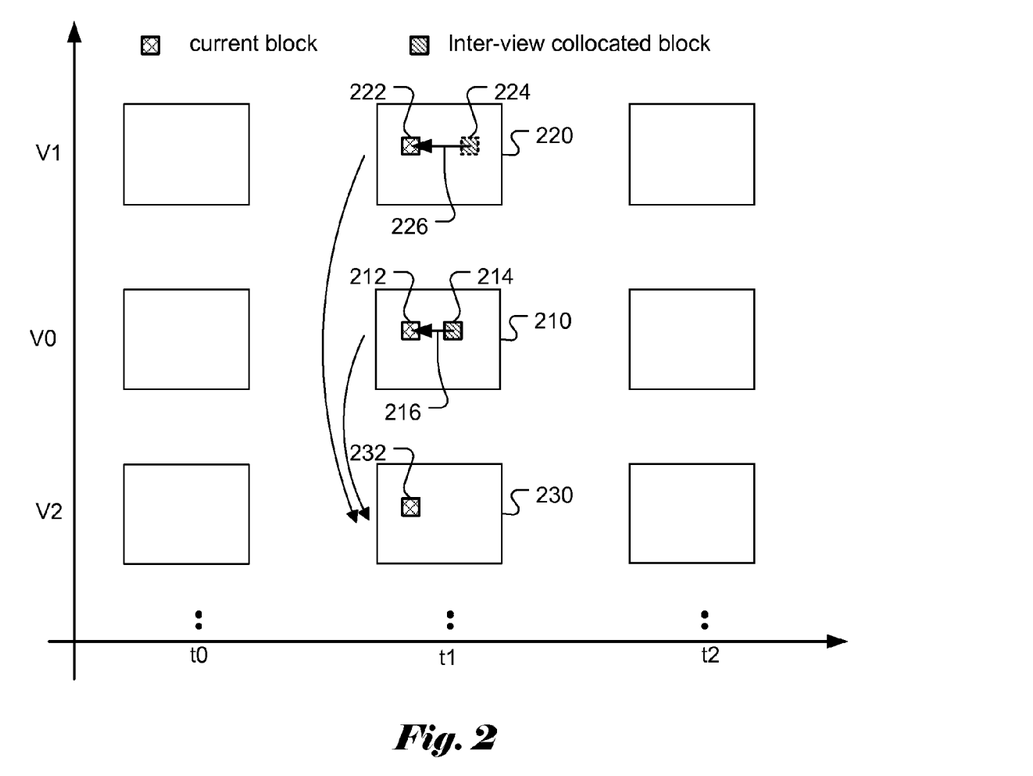
FIG. 2 illustrates an example of three-dimensional coding utilizing previously coded information or residual information from adjacent views in three-dimensional video coding test model based on High Efficiency Video Coding (3D-HTM).

Inter-view residual prediction is another coding tool used in 3D-HTM. To share the previously coded residual information of adjacent views, the residual signal of the current prediction block (i.e., PU) can be predicted by the residual signals of the corresponding blocks in the inter-view pictures as shown in FIG. 2. The corresponding blocks can be located by respective DVs. The video pictures and depth maps corresponding to a particular camera position are indicated by a view identifier (i.e., V0, V1 and V2 in FIG. 2). All video pictures and depth maps that belong to the same camera position are associated with the same viewId (i.e., view identifier). The view identifiers are used for specifying the coding order within the access units and detecting missing views in error-prone environments. An access unit includes all video pictures and depth maps corresponding to the same time instant. Inside an access unit, the video picture and, when present, the associated depth map having viewId equal to 0 are coded first, followed by the video picture and depth map having viewId equal to 1, etc. The view with viewId equal to 0 (i.e., V0 in FIG. 2) is also referred to as the base view or the independent view. The base view video pictures can be coded using a conventional HEVC video coder without dependence on other views.

As can be seen in FIG. 2, for the current block, motion vector predictor (MVP)/disparity vector predictor (DVP) can be derived from the inter-view blocks in the inter-view pictures. In the following, inter-view blocks in inter-view picture may be abbreviated as inter-view blocks. The derived candidate is termed as inter-view candidates, which can be inter-view MVPs or DVPs. The coding tools that codes the motion information of a current block (e.g., a current prediction unit, PU) based on previously coded motion information in other views is termed as inter-view motion parameter prediction. Furthermore, a corresponding block in a neighboring view is termed as an inter-view block and the inter-view block is located using the disparity vector derived from the depth information which is in association with the current block in current picture.

The example shown in FIG. 2 corresponds to a view coding order from V0 (i.e., base view) to V1, and followed by V2. The current block in the current picture being coded is in V2. According to 3D-HTM, all the MVs of reference blocks in the previously coded views can be considered as an inter-view candidate. In FIG. 2, frames 210, 220 and 230 correspond to a video picture or a depth map from views V0, V1 and V2 at time t1 respectively. Block 232 is the current block in the current view, and blocks 212 and 222 are the current blocks in V0 and V1 respectively. For current block 212 in V0, a disparity vector (216) is used to locate the inter-view collocated block (214). Similarly, for current block 222 in V1, a disparity vector (226) is used to locate the inter-view collocated block (224). According to 3D-HTM, the motion vectors or disparity vectors associated with inter-view collocated blocks from any coded views can be included in the inter-view candidates.

Figure 3A:
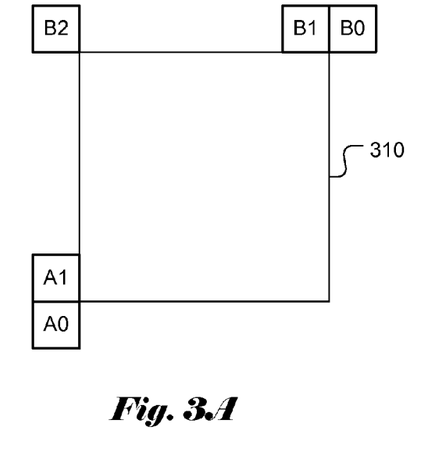
FIGS. 3A-B illustrate respective spatial neighboring blocks and temporal neighboring blocks of a current block for deriving a disparity vector for the current block in 3D-HTM.
Figure 3B:
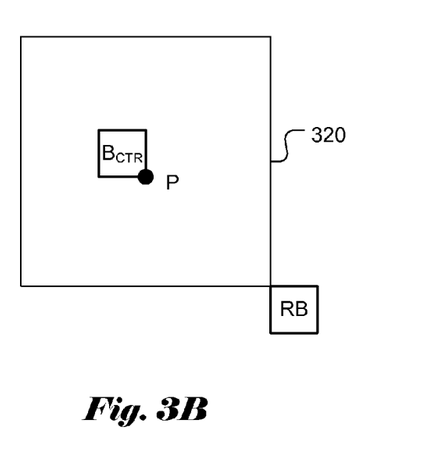

In 3DV-HTM, a disparity vector can be used as a DVP candidate for Inter mode or as a Merge candidate for Merge/Skip mode. A derived disparity vector can also be used as an offset vector for inter-view motion prediction and inter-view residual prediction. When used as an offset vector, the DV is derived from spatial and temporal neighboring blocks as shown in FIG. 3A and FIG. 3B. Multiple spatial and temporal neighboring blocks are determined and DV availability of the spatial and temporal neighboring blocks is checked according to a pre-determined order. This coding tool for DV derivation based on neighboring (spatial and temporal) blocks is termed as Neighboring Block DV (NBDV). As shown in FIG. 3A, the spatial neighboring block set includes the location diagonally across from the lower-left corner of the current block (i.e., lower-left block, A0), the location next to the left-bottom side of the current block (i.e., left-bottom block, A1), the location diagonally across from the upper-left corner of the current block (i.e., upper-left block, B2), the location diagonally across from the upper-right corner of the current block (i.e., upper-left block, B0), and the location next to the top-right side of the current block (i.e., top-right block, B1). As shown in FIG. 3B, the temporal neighboring block set includes the location at the center of the current block (i.e., $B_{CTR}$) and the location diagonally across from the right-bottom corner of the current block (i.e., right-bottom block, RB) in a temporal reference picture. As shown in FIG. 3B, the current block is located at the upper-left location of the center point P. Instead of the center location, other locations (e.g., a lower-right block) within the current block in the temporal reference picture may also be used. In other words, any block collocated with the current block can be included in the temporal block set. Once a block is identified as having a DV, the checking process will be terminated. An exemplary search order for the spatial neighboring blocks in FIG. 3A is (A1, B1, B0, A0, B2). An exemplary search order for the temporal neighboring blocks for the temporal neighboring blocks in FIG. 3B is (BR, $B_{CTR}$). The spatial and temporal neighboring blocks are the same as the spatial and temporal neighboring blocks of Inter mode (AMVP) and Merge modes in HEVC.

Figure 4:
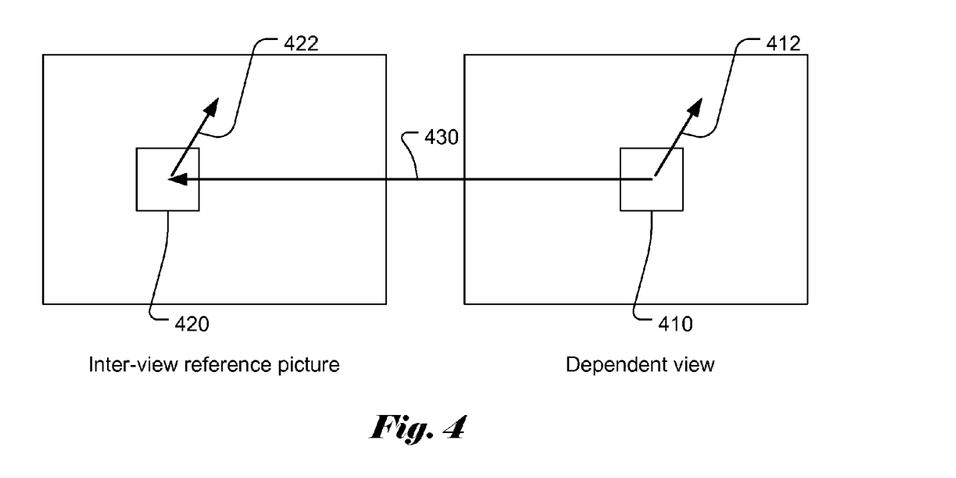
FIG. 4 illustrates an example of a disparity derivation from motion-compensated prediction (DV-MCP) block, where the location of the corresponding blocks in the reference view is specified by a disparity vector.

If a DCP coded block is not found in the neighboring block set (i.e., spatial and temporal neighboring blocks as shown in FIGS. 3A and 3B), the disparity information can be obtained from another coding tool (DV-MCP). In this case, when a spatial neighboring block is MCP coded block and its motion is predicted by the inter-view motion prediction, as shown in FIG. 4, the disparity vector used for the inter-view motion prediction represents a motion correspondence between the current and the inter-view reference picture. This type of motion vector is referred to as inter-view predicted motion vector and the blocks are referred to as DV-MCP blocks. FIG. 4 illustrates an example of a DV-MCP block, where the motion information of the DV-MCP block (410) is predicted from a corresponding block (420) in the inter-view reference picture. The location of the corresponding block (420) is specified by a disparity vector (430). The disparity vector used in the DV-MCP block represents a motion correspondence between the current and inter-view reference picture. The motion information (422) of the corresponding block (420) is used to predict motion information (412) of the current block (410) in the current view.

Figure 5:
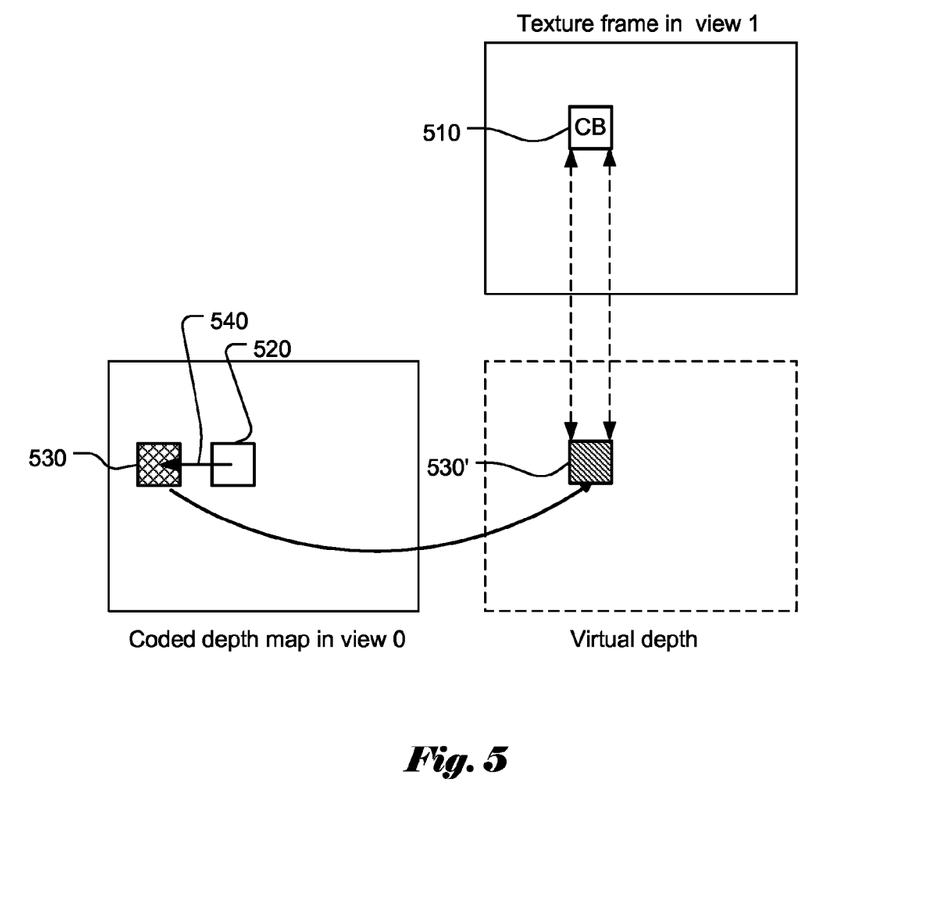
FIG. 5 illustrates an example of derivation of an estimated disparity vector based on the virtual depth of the block.

A method to enhance the NBDV by extracting a more accurate disparity vector (referred to as a refined DV in this disclosure) from the depth map is utilized in current 3D-HEVC. A depth block from coded depth map in the same access unit is first retrieved and used as a virtual depth of the current block. This coding tool for DV derivation is termed as Depth-oriented NBDV (DoNBDV). While coding the texture in view 1 and view 2 with the common test condition, the depth map in view 0 is already available. Therefore, the coding of texture in view 1 and view 2 can be benefited from the depth map in view 0. An estimated disparity vector can be extracted from the virtual depth shown in FIG. 5. The overall flow is as following:

1. Use an estimated disparity vector, which is the NBDV in current 3D-HTM, to locate the corresponding block in the coded texture view
2. Use the collocated depth in the coded view for current block (coding unit) as virtual depth.
3. Extract a disparity vector (i.e., a refined DV) for inter-view motion prediction from the maximum value in the virtual depth retrieved in the previous step.

In the example illustrated in FIG. 5, the coded depth map in view 0 is used to derive the DV for the texture frame in view 1 to be coded. A corresponding depth block (530) in the coded D0 is retrieved for the current block (CB, 510) according to the estimated disparity vector (540) and the location (520) of the current block of the coded depth map in view 0. The retrieved block (530) is then used as the virtual depth block (530') for the current block to derive the DV. The maximum value in the virtual depth block (530') is used to extract a disparity vector for inter-view motion prediction.

Figure 6:
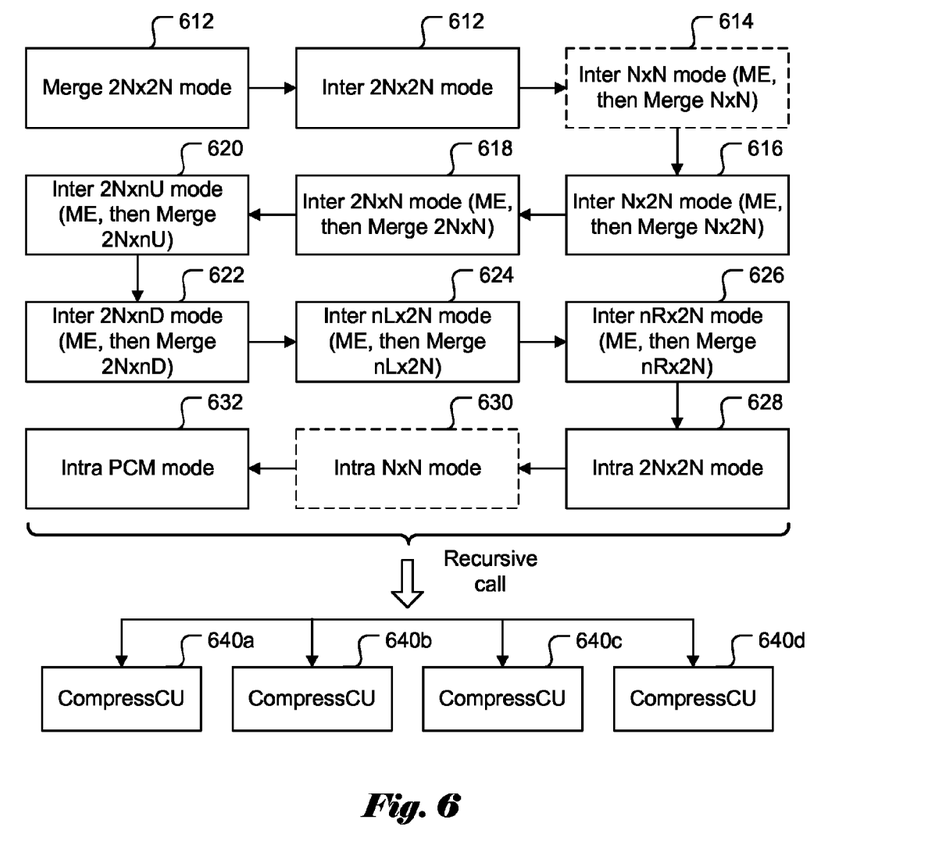
FIG. 6 illustrates an example of mode decision performed at an encoder based on 3D-HTM.

In 3D-HEVC, a basic unit for compression, termed coding tree unit (CTU) or also termed largest coding unit (LCU), is a 2N×2N square block, and each CTU can be recursively split into four smaller CUs until the predefined minimum size is reached. For determining the best CU size, the rate-distortion optimization (RDO) is often used, which is well known in the field of video coding. When encoding a CU, the rate-distortion (RD) costs for different PU types including Inter/Merge/Skip 2N×2N, Inter/Merge 2N×N, Inter/Merge N×2N, Inter/Merge N×N, Inter/Merge 2N×nU, Inter/Merge 2N×nD, Inter/Merge nL×2N, Inter/Merge nR×2N, Intra 2N×2N and Intra N×N, are examined. The RD costs for Inter/Merge N×N and Intra N×N are examined only for 8×8 CU. For each Inter PU type, motion estimation and motion compensation have to be performed to derived motion-compensated residues for RD cost evaluation. For Merge mode, the motion information is determined from the motion information of neighboring blocks. Therefore, Merge mode is more computationally efficient since the motion estimation is not performed. As it is well known in video coding that motion estimation is very computationally intensive. An exemplary encoding process is shown in FIG. 6 for a texture CU in 3D-HTM, where the RD performance for various coding modes is checked in steps 612 through 632. As mentioned earlier, the RD costs for Inter/Merge N×N and Intra N×N are examined only for 8×8 CU. In other words, steps 614 and 630 will be performed only for N=8. After a best mode is selected for a given CU, the final CUs (i.e., leaf CUs) are compressed using one of the compress CU process (640a-d).

Figure 7:
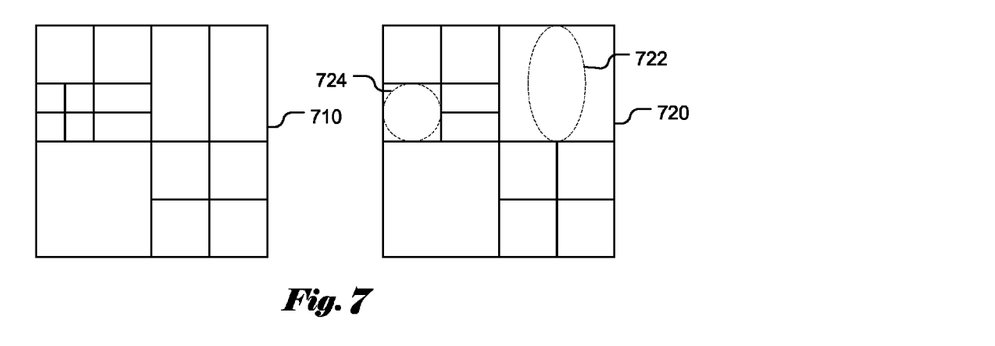
FIG. 7 illustrates an example of coding block splitting using quadtree for the texture coding tree unit and the depth coding tree unit respectively.
Figure 8:
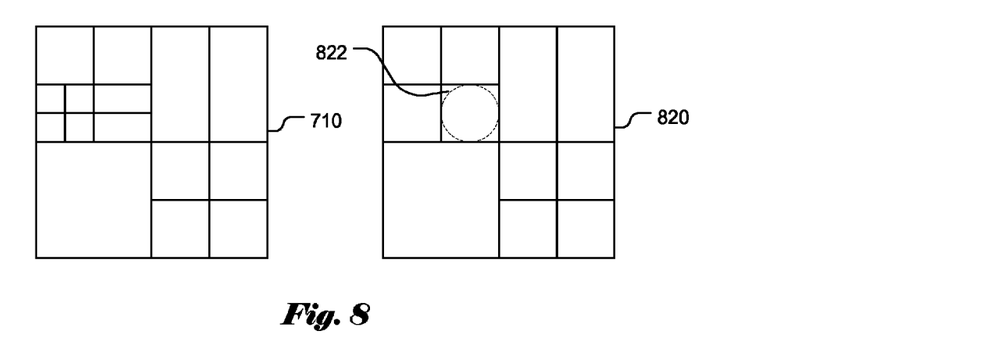
FIG. 8 illustrates another example of coding block splitting using quadtree with constraint for the texture coding tree unit and the depth coding tree unit respectively.

A CU split quadtree (QT) is determined for the texture at the encoder. Also, a splitting QT is determined for the depth at the encoder. The structure of the QTs has to be incorporated in the bitstream so that a decoder can recover the structure of the QTs. In order to reduce bits and encoding runtime, the current HTM adopts an approach where the depth QT uses the texture QT as a predictor. For a given CTU, the quadtree of the depth is linked to the collocated quadtree of the texture, so that a given CU of the depth cannot be split more than its collocated CU in the texture. One example is illustrated in FIG. 7, where block 710 corresponds to a QT for the texture CTU and block 720 corresponds to a depth CTU. As shown in FIG. 7, some partitions in the texture CTU are not performed for the depth CTU (indicated by 722 and 724). Simplification of rectangular partition can be also performed. For example, when a texture block is partitioned into 2N×N or N×2N, the corresponding depth block will not allow 2N×N, N×2N and N×N partitioning. With this additional constraint on the depth partitioning, the depth partition in FIG. 7 is illustrated in block 820 of FIG. 8, where the partition 822 is not allowed.

As shown in FIG. 6, the current encoding scheme is fairly computationally intensively. It is desirable to develop techniques to reduce the encoding complexity associated with mode decision and coding tree partition.

BRIEF SUMMARY OF THE INVENTION

A method for multi-view video encoding using early Merge mode decision and/or early CU split termination is disclosed. Embodiments according to the present invention encodes a current coding block using the Merge mode or the Skip mode without evaluating coding performance for at least one of Inter modes and Intra modes if one or more coding conditions associated with the current coding block and a neighboring block set of the current coding block are asserted. For example, the coding conditions correspond to whether the coding performance of the Skip mode is better than the coding performance of 2N×2N Merge mode for the current coding block and whether all blocks in the neighboring block set are coded using the Merge mode or the Skip mode. A typical video encoder may use rate distortion (RD) performance as the coding performance for performance evaluation. The neighboring block set may comprise a corresponding block of the current coding block in a reference view and at least one adjacent block of the corresponding block of the current coding block in the reference view. For example, the adjacent blocks may correspond to four adjacent blocks at left side, right side, top side and bottom side of the corresponding block of the current coding block in the reference view. The adjacent blocks may correspond to eight adjacent blocks around the corresponding block of the current coding block in the reference view. Furthermore, the neighboring block set may also comprise one or more spatial neighboring blocks of the current coding block of the current picture in the current dependent view, a temporal neighboring block of the current coding block in a temporal reference picture in the dependent view, or both said one or more spatial neighboring blocks and the temporal neighboring block.

The fast coding mode decision based on one or more coding conditions associated with the current coding block and a neighboring block set of the current coding block can also be applied to early CU split termination. The process of splitting the current coding block into smaller coding blocks can be terminated without evaluating coding performance associated with the smaller coding blocks from splitting the current coding block if the coding conditions are asserted.

DETAILED DESCRIPTION OF THE INVENTION

In order to reduce encoder complexity associated with coding mode decision using coding performance evaluation such as rate-distortion optimization (RDO), embodiments according to the present invention use early coding unit (CU)/prediction unit (PU) Merge mode decision or early CU split termination. As shown in FIG. 6, the conventional encoder according to 3D-HTM (three-dimensional High Efficiency Video Coding (HEVC) Test Model). Therefore, the conventional encoder mode decision involves very intensive computations in order to identify a best coding mode and best coding tree unit partition. One embodiment of the present invention uses early CU/PU Merge mode decision to substantially reduce the required computations.

Figure 9A:
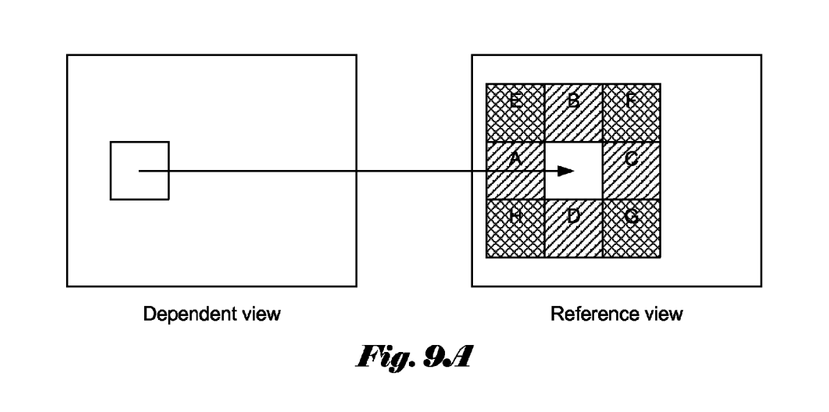
FIG. 9A illustrates an example of the neighboring block set consisting of the corresponding block of the current block in a reference view and four adjacent blocks of the corresponding block.

According to one embodiment of the present invention, the decision regarding whether all PUs within a current CU should be coded as Merge mode or Skip mode is made by checking the coding conditions of the current CU and neighboring blocks of the current CU. The coding condition of the current CU is referred as local condition and the coding conditions of neighboring blocks of the current CU is referred as reference condition in this disclosure. The neighboring blocks of the current CU are defined as one of the following categories:

Category 1: The set of blocks in Category 1 includes the corresponding block for the current CU of a current picture in the dependent view and four adjacent blocks of the corresponding block in the reference view, corresponding to the left side block (A), right side block (C), top side block (B) and bottom side block (D) as shown in FIG. 9A.

Category 2: The set of blocks in Category 2 includes the corresponding block for the current CU of a current picture in the dependent view and eight adjacent blocks surrounding the corresponding block in reference view (i.e., blocks A-H in FIG. 9A).

Category 3: The set of blocks in Category 3 includes the corresponding block for the current CU of a current picture in the dependent view and a subset of the eight adjacent blocks around the corresponding block in reference view in reference view.

Figure 9B:
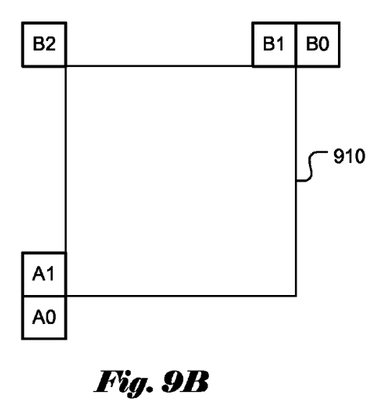
FIGS. 9B-C illustrate an example of the neighboring block set consisting of four spatial neighboring blocks of the current coding block of the current picture in the current dependent view and a temporal neighboring block of the current coding block in a temporal reference picture in the current dependent view respectively.

Category 4: The set of blocks in Category 4 includes spatial neighboring blocks of the current CU corresponding to a lower-left block ($A_0$), a left-bottom block ($A_1$), an upper-left block ($B_2$), a top-right block ($B_1$) and an upper-right block ($B_0$) as shown in FIG. 9B.

Figure 9C:
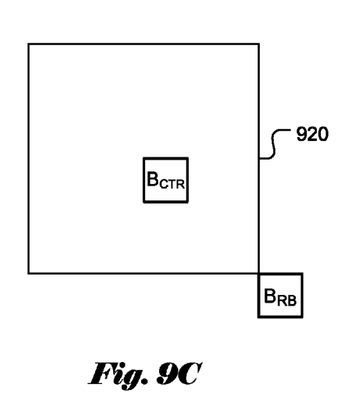

Category 5: The set of blocks in Category 5 includes temporal neighboring blocks of the current CU corresponding to a bottom-right block ($B_{RB}$) across from a lower-right corner of a temporally collocated block of the current block in the temporal reference picture as shown in FIG. 9C. A center block ($B_{CTR}$) located at a lower-right location from a center point of the temporally collocated block is selected as the temporal neighboring block if motion information associated with $B_{RB}$ is not available.

Category 6: The set of blocks in Category 6 includes any combination of the inter-view neighboring blocks, spatial neighboring blocks, or temporal neighboring blocks of the current CU.

Figure 10:
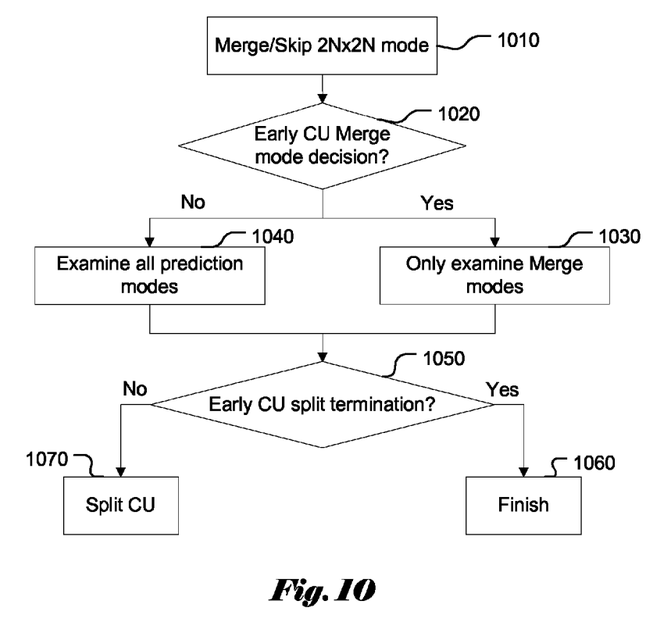
FIG. 10 illustrates an exemplary flowchart for a multi-view encoding system incorporating early CU Merge mode decision and early CU split termination according to an embodiment of the present invention.

If the best prediction mode for the current CU can be early determined as Merge mode, the encoder only needs to test the RD performance of Merge mode for different PU types. Accordingly, the computationally intensive motion estimation process can be spared. The RD test of an exemplary encoder incorporating an embodiment of early Merge mode decision is shown in FIG. 10. There are various embodiments associated with early Merge mode decision if the current CU/PU is Skip or Merge mode.

In embodiment 1 of early Merge mode decision, the local condition corresponds to "the rate-distortion (RD) performance of Skip mode is better than 2N×2N Merge mode for the current CU". In this embodiment, when the above condition is true, the encoder only needs to test the RD performance of Merge mode for different PU types. There is no need for performing either the motion estimation process of Inter mode or the RD test of Intra mode as shown in FIG. 10.

In embodiment 2 of early Merge mode decision, the reference condition corresponds to "all of the neighbor blocks of the current CU select Merge mode or Skip mode as the best prediction mode". In this embodiment, when the above condition is true, the encoder only tests the RD performance of Merge mode for different PU types. There is no need for performing either the motion estimation process of Inter mode or the RD test of Intra mode as shown in FIG. 10.

In embodiment 3 of early Merge mode decision, the local condition corresponds to "the rate-distortion (RD) performance of Skip mode is better than 2N×2N merge mode in current CU" and the reference condition corresponds to "all of the neighbor blocks of current CU select Merge mode or Skip mode as the best prediction mode". In this embodiment, when both local and reference conditions are true, the encoder only tests the RD performance of Merge mode for different PU types. There is no need for performing either the motion estimation process of Inter mode or the RD test of Intra mode as shown in FIG. 10.

According to another embodiment of the present invention, an early decision regarding whether to split the current CU is made by checking the coding information related to the current CU and neighboring blocks of the current CU. The neighboring blocks of the current CU can be configured into different categories. For example, the six categories described above for the early Merge decision can be applied to early CU split decision.

When both local condition and reference conditions are true, no further split is needed for current CU. In the following paragraph, we will show different schemes to early determine if current CU should be further split.

In embodiment 1 of early CU split termination, the condition corresponds to "the depth of the current CU is equal to or larger than the maximum depth of the neighboring blocks". In this embodiment, when the above condition is true, no further split is needed for the current CU as shown in FIG. 10. In this case, the "Yes" branch from Early CU split termination 1050 to Finish 1060 is selected.

In embodiment 2 of early CU split decision, the local condition corresponds to "the best prediction mode of the current CU is Skip mode after checking all possible prediction modes" and the reference condition corresponds to "the depth of the current CU is equal to or larger than the maximum depth of the neighboring blocks". In this embodiment, when both the local and reference conditions are true, no further split is needed for the current CU as shown in FIG. 10.

The performance of a 3D or multi-view video coding system incorporating an embodiment of the present invention is compared to the performance of a conventional system based on HTM-7.0 as shown in Tables 1-3 for early Merge mode decision, early CU split termination decision, and both respectively. The BD-rate differences for texture pictures in view 1 (video 1) and view 2 (video 2) are very small for early CU Merge decision as shown in Table 1. On the other hand, the BD-rate differences for texture pictures in view 1 (video 1) and view 2 (video 2) show some improvement (0.8 and 0.95) for early CU split termination, and combined early CU Merge decision and early CU split termination as shown in Table 2 and Table 3 respectively. The second group of performance is the bitrate measurement for texture video only (video/video bitrate), the total bitrate (texture bitrate and depth bitrate) for texture video (video/total bitrate) and the total bitrate for coded and synthesized video (Coded & synth/total bitrate). As shown in Table 1-Table 3, the performance for the second group is about the same compared to the conventional method based on HTM-7.0. While the RD performance is about the same or slightly better than the conventional approach, embodiments according to the present invention illustrate substantial reduction in encoding time. As shown in Table 1, the encoding time is reduced by 32.1% when early CU Merge decision is utilized alone. As shown in Table 2, the encoding time is reduced by 39.3% when early CU split termination is utilized alone. When both are used, the encoding time is reduced by 47.3% as shown in Table. Therefore, embodiments according to the present invention can substantially reduce the encoding time without the penalty of performance loss.

TABLE 1

|  | Video 1 | Video 2 | video/Video bitrate | video/total bitrate | coded & synth/total bitrate | Enc time | Dec time | Ren time |
|---|---|---|---|---|---|---|---|---|
| Balloons | 0.0% | −0.1% | 0.1% | 0.1% | 0.0% | 71.3% | 104.3% | 100.0% |
| Kendo | 0.1% | 0.1% | 0.1% | 0.1% | 0.0% | 71.2% | 98.2% | 100.7% |
| Newspapercc | −0.2% | 0.0% | 0.0% | 0.1% | 0.0% | 66.3% | 99.3% | 97.6% |
| GhostTownFly | 0.2% | −0.1% | 0.1% | 0.1% | 0.0% | 73.5% | 98.5% | 100.5% |
| PoznanHall2 | 0.3% | 0.6% | 0.5% | 0.5% | 0.1% | 61.8% | 98.5% | 96.5% |
| PoznanStreet | −0.3% | −0.2% | 0.1% | 0.1% | 0.0% | 63.6% | 94.7% | 100.3% |
| UndoDancer | −.2% | −0.2% | 0.1% | 0.1% | 0.0% | 67.4% | 101.2% | 98.5% |
| 1024 × 768 | 0.0% | 0.0% | 0.1% | 0.1% | 0.0% | 69.6% | 100.6% | 99.4% |
| 1920 × 1088 | 0.0% | 0.0% | 0.2% | 0.2% | 0.0% | 66.5% | 98.2% | 99.0% |
| average | 0.0% | 0.0% | 0.1% | 0.1% | 0.0% | 67.9% | 99.2% | 99.2% |

TABLE 2

|  | Video 1 | Video 2 | video/Video bitrate | video/total bitrate | coded & synth/total bitrate | Enc time | Dec time | Ren time |
|---|---|---|---|---|---|---|---|---|
| Balloons | 0.0% | −0.1% | 0.1% | 0.1% | 0.0% | 71.3% | 104.3% | 100.0% |
| Kendo | 0.1% | 0.1% | 0.1% | 0.1% | 0.0% | 71.2% | 98.2% | 100.7% |
| Newspapercc | −0.2% | 0.0% | 0.0% | 0.1% | 0.0% | 66.3% | 99.3% | 97.6% |
| GhostTownFly | 0.2% | −0.1% | 0.1% | 0.1% | 0.0% | 73.5% | 98.5% | 100.5% |
| PoznanHall2 | 0.3% | 0.6% | 0.5% | 0.5% | 0.1% | 61.8% | 98.5% | 96.5% |
| PoznanStreet | −0.3% | −0.2% | 0.1% | 0.1% | 0.0% | 63.6% | 94.7% | 100.3% |
| UndoDancer | −.2% | −0.2% | 0.1% | 0.1% | 0.0% | 67.4% | 101.2% | 98.5% |
| 1024 × 768 | 0.0% | 0.0% | 0.1% | 0.1% | 0.0% | 69.6% | 100.6% | 99.4% |
| 1920 × 1088 | 0.0% | 0.0% | 0.2% | 0.2% | 0.0% | 66.5% | 98.2% | 99.0% |
| average | 0.0% | 0.0% | 0.1% | 0.1% | 0.0% | 67.9% | 99.2% | 99.2% |

TABLE 3

|  | Video 1 | Video 2 | video/Video bitrate | video/total bitrate | coded & synth/total bitrate | Enc time | Dec time | Ren time |
|---|---|---|---|---|---|---|---|---|
| Balloons | 0.0% | −0.1% | 0.1% | 0.1% | 0.0% | 71.3% | 104.3% | 100.0% |
| Kendo | 0.1% | 0.1% | 0.1% | 0.1% | 0.0% | 71.2% | 98.2% | 100.7% |
| Newspapercc | −0.2% | 0.0% | 0.0% | 0.1% | 0.0% | 66.3% | 99.3% | 97.6% |
| GhostTownFly | 0.2% | −0.1% | 0.1% | 0.1% | 0.0% | 73.5% | 98.5% | 100.5% |
| PoznanHall2 | 0.3% | 0.6% | 0.5% | 0.5% | 0.1% | 61.8% | 98.5% | 96.5% |
| PoznanStreet | −0.3% | −0.2% | 0.1% | 0.1% | 0.0% | 63.6% | 94.7% | 100.3% |
| UndoDancer | −.2% | −0.2% | 0.1% | 0.1% | 0.0% | 67.4% | 101.2% | 98.5% |
| 1024 × 768 | 0.0% | 0.0% | 0.1% | 0.1% | 0.0% | 69.6% | 100.6% | 99.4% |
| 1920 × 1088 | 0.0% | 0.0% | 0.2% | 0.2% | 0.0% | 66.5% | 98.2% | 99.0% |
| average | 0.0% | 0.0% | 0.1% | 0.1% | 0.0% | 67.9% | 99.2% | 99.2% |

Figure 11:
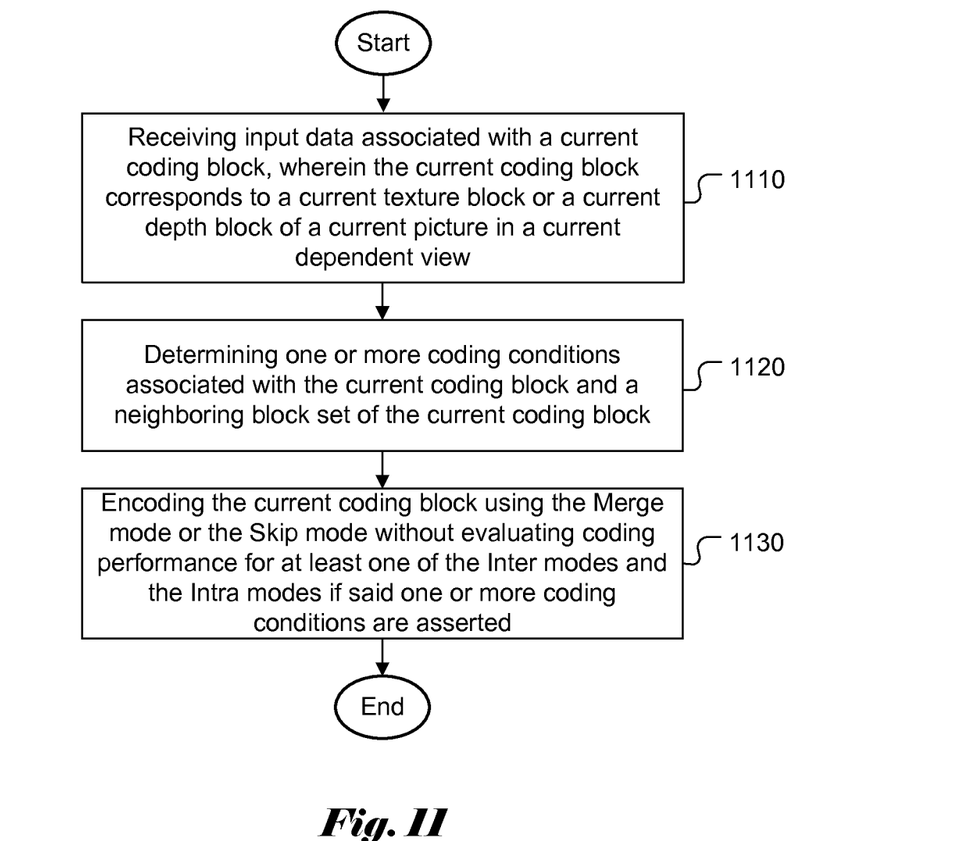
FIG. 11 illustrates an exemplary flowchart for a multi-view encoding system incorporating early CU Merge mode decision.

FIG. 11 illustrates an exemplary flowchart of a multi-view encoding system incorporating early CU Merge decision according to an embodiment of the present invention. The system receives input data associated with a current coding block as shown in step 1110, wherein the current coding block corresponds to a current texture block or a current depth block of a current picture in a current dependent view. The input data may be retrieved from storage such as a computer memory, buffer (RAM or DRAM) or other media. The input data may also be received from a processor such as a controller, a central processing unit, a digital signal processor or electronic circuits that produce the input data. The coding conditions associated with the current coding block and a neighboring block set of the current coding block are determined in step 1120. The current coding block is then encoded using the Merge mode or the Skip mode without evaluating the rate distortion (RD) performance for at least one of the Inter modes and Intra Modes if the coding conditions are asserted as shown in step 1130.

Figure 12:
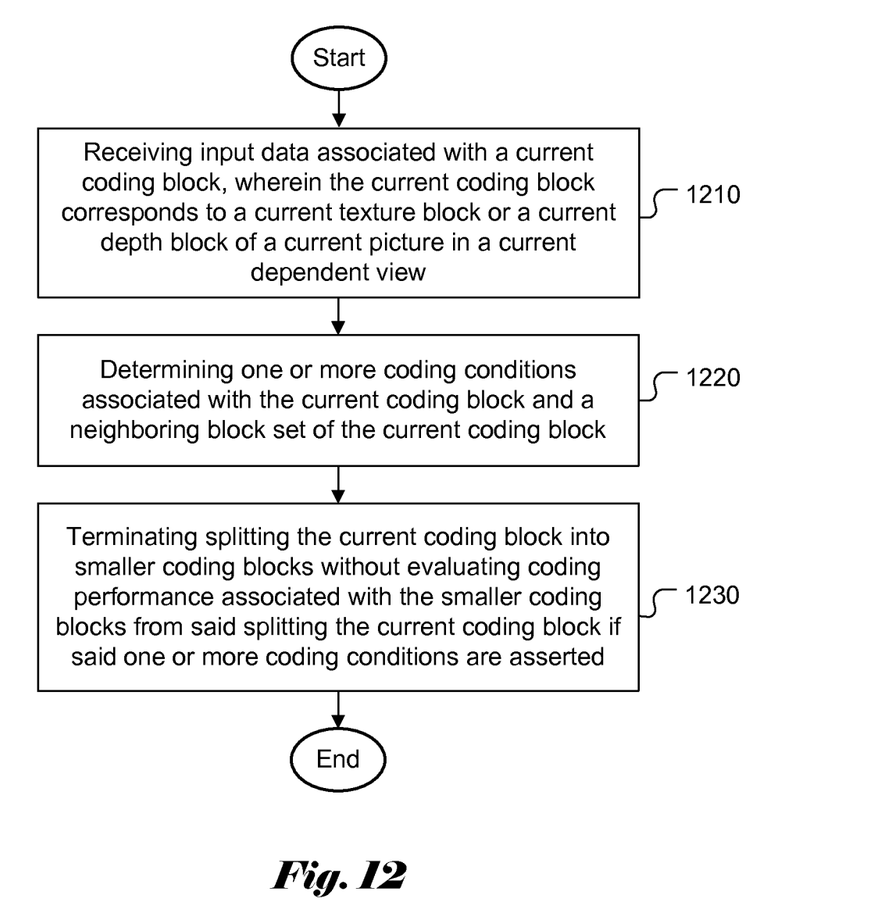
FIG. 12 illustrates an exemplary flowchart for a multi-view encoding system incorporating early CU split termination according to an embodiment of the present invention.

FIG. 12 illustrates an exemplary flowchart of a multi-view encoding system incorporating early CU split termination according to an embodiment of the present invention. The system receives input data associated with a current coding block as shown in step 1210, wherein the current coding block corresponds to a current texture block or a current depth block of a current picture in a current dependent view. The coding conditions associated with the current coding block and a neighboring block set of the current coding block are determined in step 1220. Splitting of the current coding block into smaller coding blocks is terminated without evaluating the rate distortion (RD) performance associated with the smaller coding blocks from splitting the current coding block if the coding conditions are asserted.

The flowcharts shown above are intended to illustrate examples of inter-view prediction using early CU Merge decision and/or early CU split termination. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for multi-view video encoding using multiple coding modes for a coding block in a dependent view, wherein the multiple coding modes comprise Merge mode, Skip mode, Inter modes and Intra modes, and wherein the coding block is allowed to split into smaller coding blocks, the method comprising:

receiving input data associated with a current coding block, wherein the current coding block corresponds to a current texture block or a current depth block of a current picture in a current dependent view;

determining one or more coding conditions associated with the current coding block and a neighboring block set of the current coding block, wherein said one or more coding conditions correspond to whether a coding performance of the Skip mode is better than a coding performance of 2N×2N Merge mode for the current coding block; and encoding the current coding block using the Merge mode or the Skip mode without evaluating coding performance for at least one of the Inter modes and the Intra modes if said one or more coding conditions are asserted.

2. The method of claim 1, wherein said one or more coding conditions further correspond to whether all blocks in the neighboring block set are coded using the Merge mode or the Skip mode.

3. The method of claim 1, wherein the neighboring block set comprises a corresponding block of the current coding block in a reference view and at least one adjacent block of the corresponding block of the current coding block in the reference view.

4. The method of claim 3, wherein said at least one adjacent block corresponds to four adjacent blocks at left side, right side, top side and bottom side of the corresponding block of the current coding block in the reference view.

5. The method of claim 3, wherein said at least one adjacent block corresponds to eight adjacent blocks around the corresponding block of the current coding block in the reference view.

6. The method of claim 1, wherein the neighboring block set comprises one or more spatial neighboring blocks of the current coding block of the current picture in the current dependent view, a temporal neighboring block of the current coding block in a temporal reference picture in the current dependent view, or both said one or more spatial neighboring blocks and the temporal neighboring block.

7. The method of claim 6, wherein said one or more spatial neighboring blocks correspond to a lower-left block, a left-bottom block, an upper-left block, a top-right block and an upper-right block.

8. The method of claim 6, wherein the temporal neighboring block corresponds to a bottom-right block across from a lower-right corner of a temporally collocated block of the current block in the temporal reference picture, and wherein a center block located at a lower-right location from a center point of the temporally collocated block is selected as the temporal neighboring block if motion information associated with the bottom-right block across from the lower-right corner of the temporally collocated block is not available.

9. The method of claim 1, wherein the coding block corresponds to a coding unit (CU).

10. The method of claim 1, further comprising: determining one or more second coding conditions associated with the current coding block and a second neighboring block set of the current coding block; and terminating splitting the current coding block into smaller coding blocks without evaluating the coding performance associated with the smaller coding blocks from said splitting the current coding block if said one or more second coding conditions are asserted.

* * * * *